March 23, 1926. 1,577,627
T. H. WEBSTER
MEANS FOR HANDLING PROJECTILES AND OTHER BODIES
Filed Sept. 14, 1925 5 Sheets-Sheet 2
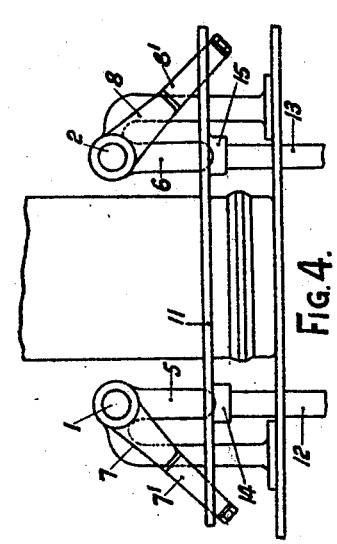
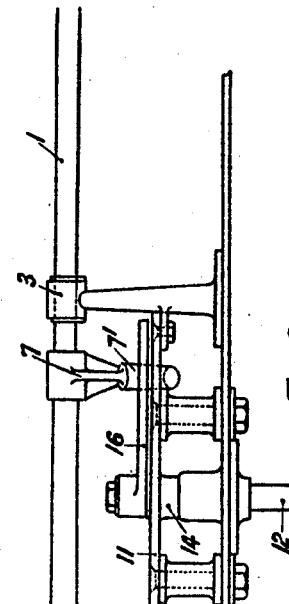
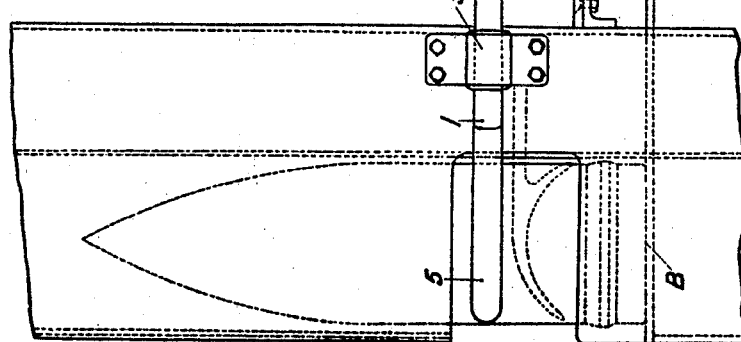
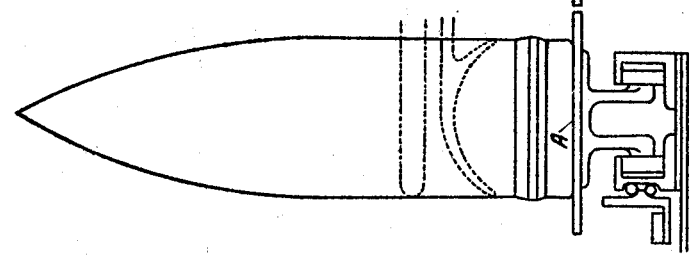

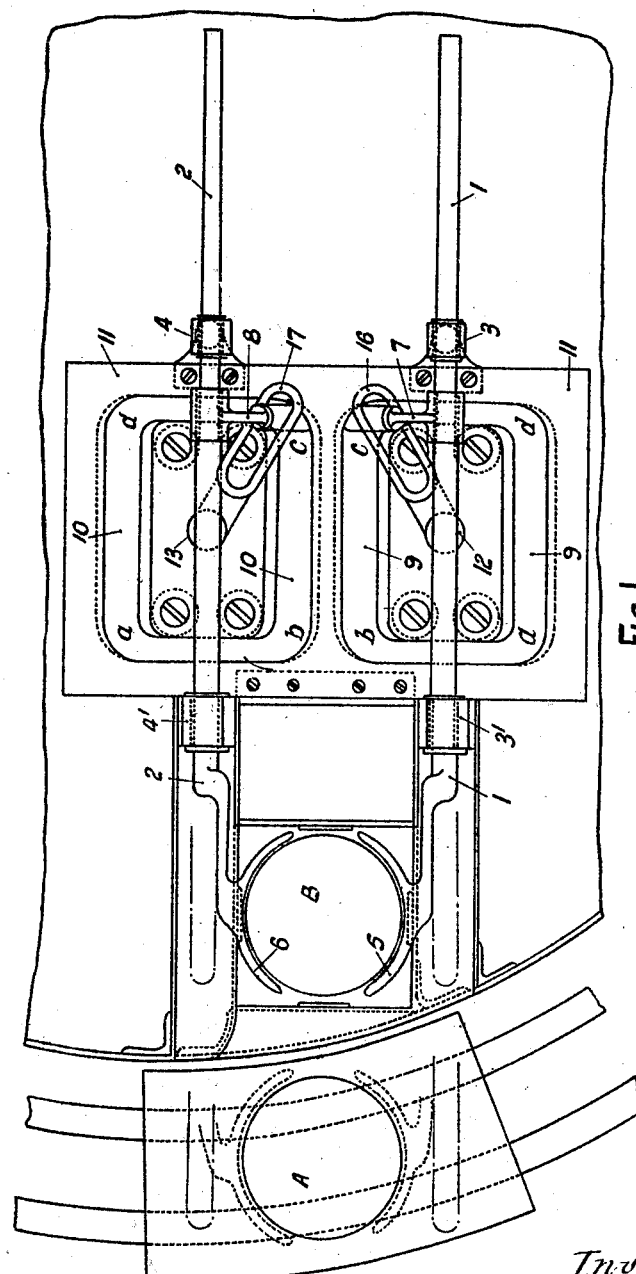

March 23, 1926.  
T. H. WEBSTER  
1,577,627  
MEANS FOR HANDLING PROJECTILES AND OTHER BODIES  
Filed Sept. 14, 1925   5 Sheets-Sheet 3
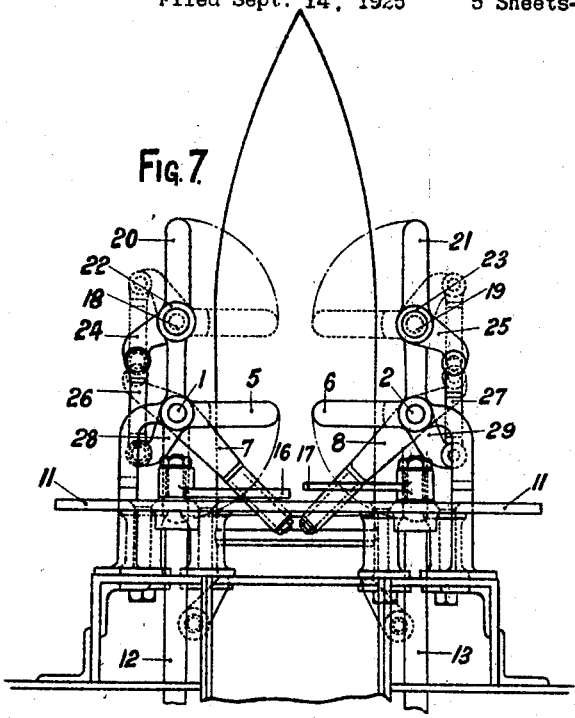
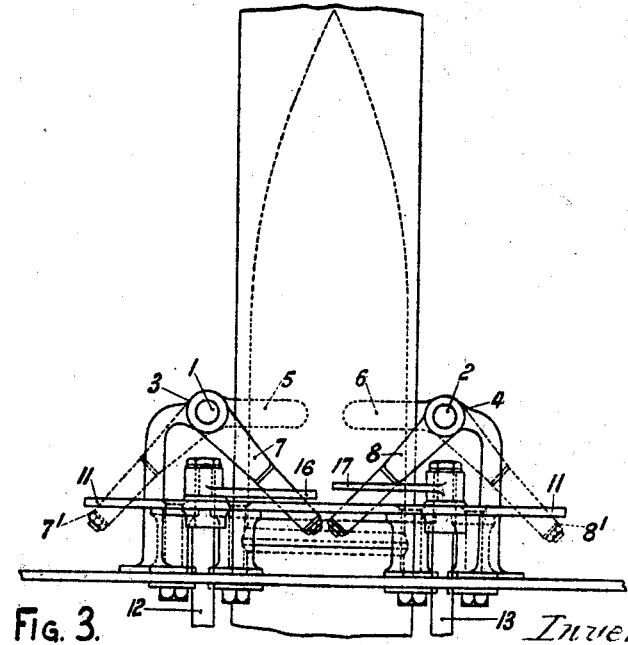

March 23, 1926.                                                1,577,627
T. H. WEBSTER
MEANS FOR HANDLING PROJECTILES AND OTHER BODIES
Filed Sept. 14, 1925      5 Sheets-Sheet 5

Inventor:
Thomas Herbert Webster
by Calvert Calvert
Attorneys.

Patented Mar. 23, 1926.

1,577,627

UNITED STATES PATENT OFFICE.

THOMAS HERBERT WEBSTER, OF LONDON, ENGLAND.

MEANS FOR HANDLING PROJECTILES AND OTHER BODIES.

Application filed September 14, 1925. Serial No. 56,207.

*To all whom it may concern:*

Be it known that I, THOMAS HERBERT WEBSTER, a subject of the King of Great Britain and Northern Ireland, and residing at London, England, have invented certain new and useful Improvements in Means for Handling Projectiles and Other Bodies, of which the following is a specification.

This invention relates to apparatus for moving a body or bodies resting on a surface or guide-way from one determinate point to another, being more particularly concerned with apparatus for handling bodies having limited stability, e. g., projectiles set in upright position, and to be moved along a guideway which may itself be unsteady, as on board ship.

The apparatus of the invention may be adapted for moving bodies one at a time in one step through a distance slightly in excess of the width of the body, or for moving bodies singly or a number of bodies in echelon through a greater distance by a series of like steps.

More particularly the invention relates to apparatus of the type comprising grippers disposed on each side of the path of the body or bodies to be moved and movable in a cycle whereby the body is engaged, advanced and released, followed by return of the grippers to initial position. The apparatus of the invention comprises companion parallel bars disposed on each side of the body or bodies to be moved and having co-operating jaws or projections or the like engageable with the body, and means for moving the bars in unison in a cycle comprising four consecutive steps namely, partial rotation in opposite directions, endwise movement in the same direction, reverse partial rotation and reverse endwise movement.

The requisite movements may conveniently be imparted to the bars by mechanism including a stationary cam and a driven follower connected to each bar.

There may be incorporated in the apparatus means for steadying or supporting the body when at rest and disengaged from the jaws or projections aforesaid.

Figure 5:
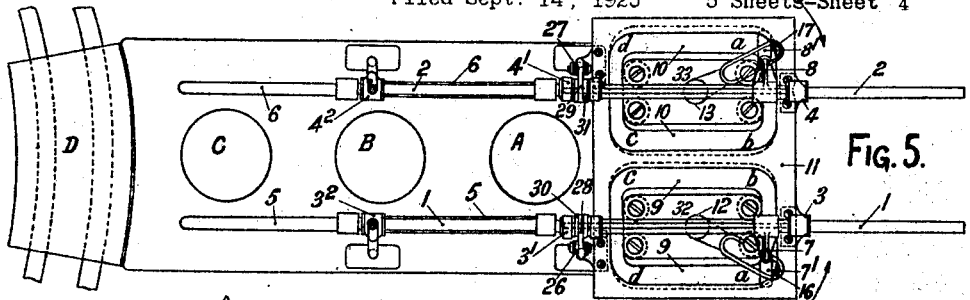
Figure 6:
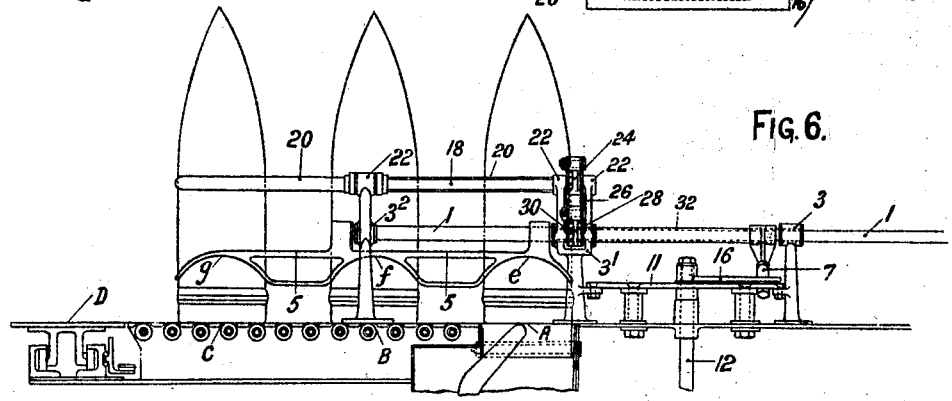
Figure 8:
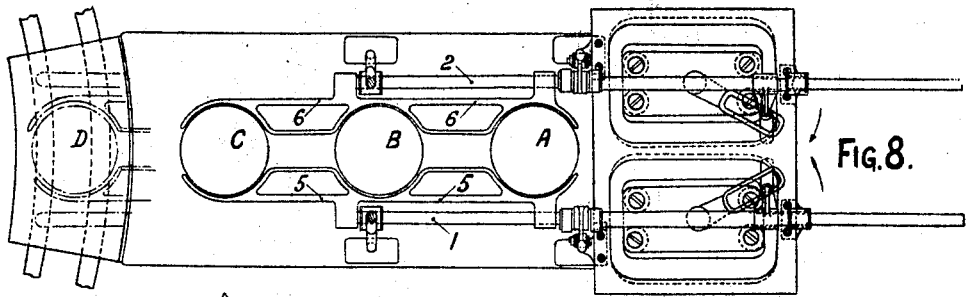
Figure 9:
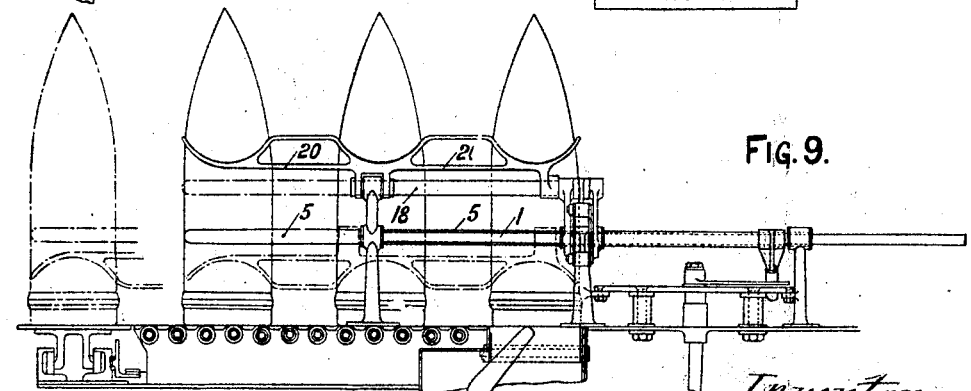
Figure 10:
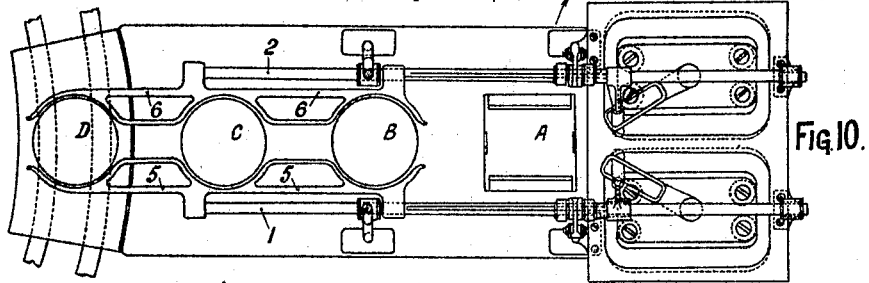
Figure 11:
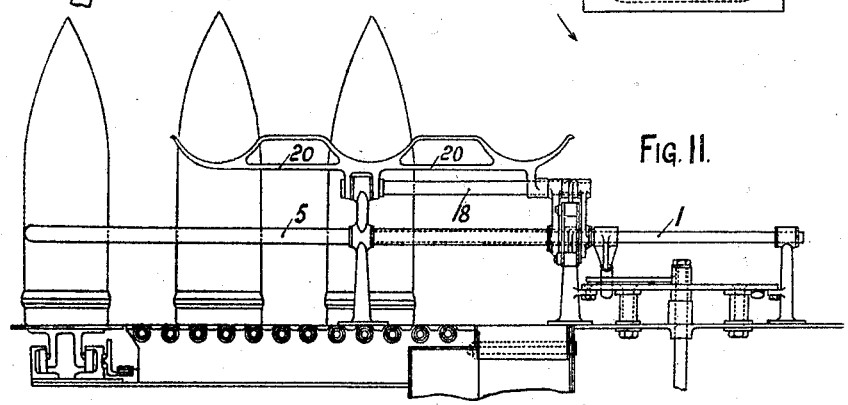
Figure 12:
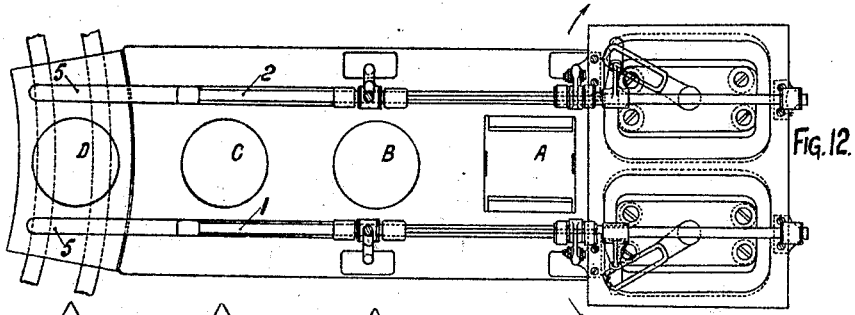

Two illustrative examples of apparatus according to the invention as adapted for the movement of projectiles between the floor of a hoist and the floor of a trolley are shown in the accompanying drawings in which Figs. 1, 2 and 3 are views of the first example in plan, side elevation and end elevation, respectively, and Fig. 4 is a view in end elevation, with parts of the mechanism removed, also of the first example. Figs. 5, 6 and 7 views of the second example in plan, side elevation and end elevation, respectively. Figs. 8, 10 and 12 additional plan views of the second example with parts of the mechanism removed, and Figs. 9, 11 and 13 additional views in side elevation of the second example.

The first example, as shown in Figs. 1 to 4, is of apparatus adapted to move a projectile in one step from a position A on the floor of a trolley to a position B on the floor of a hoist. Freely mounted in bearings 3, $3^1$ and 4, $4^1$ are two operating bars 1, 2 disposed one on either side of, and parallel with, a line passing through the projectile positions A and B. At one end of each bar is a projection 5 or 6 in the form of a double horn adapted partly to embrace the projectile. Intermediate the ends of each bar is a lever arm 7 or 8 carrying at its free end a cam roll $7^1$ or $8^1$ entering a guide slot 9 or 10 formed in a guide plate 11 which lies in a plane parallel with the floors aforesaid, or parallel to the axis of the operating bar. Each guide slot is rectangular in contour, the rectangle comprising two sides parallel to the operating bar and two sides normal thereto. A shaft 12 or 13 disposed perpendicular to the plane of the guide plate 11 and directly beneath each bar 1 or 2 is journalled in a bearing 14 or 15 carried by the guide plate 11 at the point of intersection of the diagonals of the rectangular figure presented by the slot 9 or 10. Carried by each shaft 12 or 13 is a crank arm 16 or 17 slotted for engagement with the roll $7^1$ or $8^1$.

In operation, the shafts 12 and 13 are driven by any convenient means (not shown) in such manner that the slotted crank arms 16 and 17 rotate at the same speed but in opposite directions and cause the rolls $7^1$, $8^1$ of the levers 7 and 8 to move in unison along their respective guide slots 9 and 10. Due to the rectangular configuration of the guide slots, each of the bars is caused to perform a cycle of four distinct movements, the first movement occurring while the rolls $7^1$ and $8^1$ move along the guide slots from $a$ to $b$ (Fig. 1), the second movement during the passage of the rolls from $b$ to $c$, the third movement during the passage of the rolls from $c$ to $d$, and the fourth movement during the passage of the rolls from $d$ to $a$. The first movement of the bars 1 and 2 is one of partial rotation about their axes, causing the jaws 5 and 6 to clasp between them the projectile situated at the position A, the second movement being an axial one, causing the projectile to be advanced from the position A to the position B, the third movement one of partial rotation in a reverse direction to that of the first movement, causing the jaws 5 and 6 to become disengaged from the projectile (Fig. 4), and the fourth movement again axial, but in a reverse direction to that of the second movement, whereby the bars are restored to initial position, the projectile being left at the position B.

The second example, illustrated in Figs. 5 to 13, is of an apparatus adapted to move a projectile or a stream of projectiles, step by step, from a position A on the floor of a hoist to a position D on the floor of a trolley, each step being equal to ⅓ the total distance from the position A to the position D. The apparatus of this example, in addition to the means for moving the projectiles, includes means for steadying the projectiles when disengaged from the moving means.

As in the first example, the apparatus of Figs. 5 to 13 comprises two bars 1 and 2 mounted in bearings 3, $3^1$, $3^2$ and 4, $4^1$, $4^2$ and provided with lever arms 7 and 8 carrying rolls $7^1$, $8^1$ engaging slots 9 and 10 in a guide plate 11 and also slots in crank arms 16, 17 on shafts 12, 13. The operation of the cam mechanism will be readily understood from the description of the first example. Each operating bar carries a jaw-forming member 5 or 6 presenting three spaced jaws $e$, $f$, $g$, each adapted partly to embrace a projectile, the distance between the jaws $e$ and $f$ and between $f$ and $g$ being equal to ⅓ the total distance from A to D. The cycle of movements imparted to the bars 1 and 2 is identical with that imparted to the bars of the first example, it being understood that in three repetitions of each cycle a body initially at the point A will be successively engaged by the jaws $e$, $f$ and $g$ and finally left at the position D. It will be seen that if a stream of projectiles is brought to the position A the apparatus will convey the projectiles step by step in echelon to the position D, the jaw-forming members 5 and 6 engaging and disengaging three projectiles simultaneously.

For the purpose of steadying the projectiles at the positions A, B and C while disengaged from the jaws $e$, $f$ and $g$, steadying rods 18, 19, each fitted with a jaw-forming member 20 or 21 similar to the member 5 or 6 on the operating bar 1 or 2, are so mounted in bearings 22 or 23 at a different level from the operating bars 1, 2 as to be capable of rotation but not of endwise movement. Fixed to each of the rods 18 or 19 is a lever 24 or 25 connected by a link 26 or 27 to a similar lever 28 or 29 on the operating bar 1 or 2. Each of the levers 28, 29 has a boss 30 or 31 through which the relative operating bar 1 or 2 passes freely. A feather in the boss engaging with a featherway 32 or 33 on the operating bar permits of endwise movement of the operating bar relatively to the boss but transmits angular movement to the lever 28 or 29 when the operating bar is rocked. The relative disposition of the members 5, 6 and 20, 21 and the connections between the bars 1, 2 and the rods 18, 19 are such that, on movement of the bars 1 and 2 to bring the members 5 and 6 into engagement with the projectiles, the members 20 and 21 are disengaged from the projectiles and vice versa.

For the better understanding of the sequence of operations performed reference should be made to Figs. 5 and 6, Figs. 8 and 9, Figs. 10 and 11 and Figs. 12 and 13.

Operation (1) of the cycle takes place between the positions shown in Figs. 5 and 6 and Figs. 8 and 9.

Operation (2) takes place between the positions shown in Figs. 8 and 9 and Figs. 10 and 11.

Operation (3) takes place between the positions shown in Figs. 10 and 11 and Figs. 12 and 13.

Figure 13:
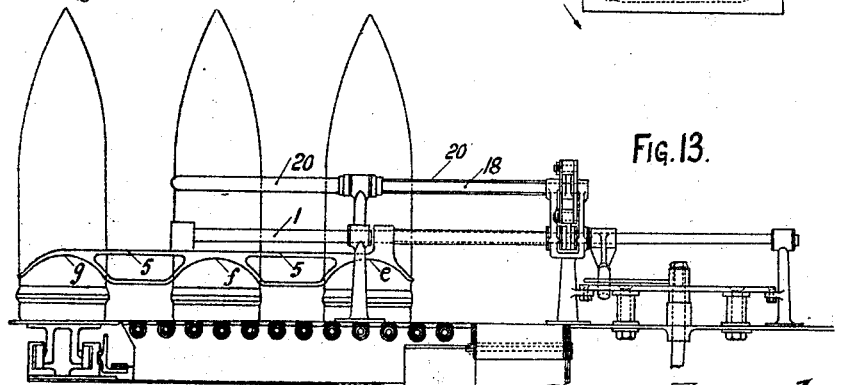

Operation (4) takes place between the positions shown in Figs. 12 and 13.

The crank arms 16, 17 are continuously rotated in the direction of the arrows X, Y, respectively, during the cycle.

It is understood, that, as the projectiles are successively brought to the position D, empty trolleys are brought into position to receive them.

As shown, a roller path may be provided for the projectiles.

I wish it to be understood that the invention is not limited to the specific features of construction shown and described. For instance, in lieu of the described mechanism for moving the followers $7^1$, $8^1$ along the rectangular cam slots, there may be provided an arrangement of chains or belts connected to the followers and trained around sprocket wheels or pulleys disposed at the corners of the rectangles. Alternatively, means other than the described arrangement of stationary cams with driven followers may be provided for effecting the required endwise reciprocatory and oscillatory movements of the bars 1, 2.

It is also to be understood that both the apparatus shown in Figs. 1 to 4 and that shown in Figs. 5 to 13 are capable of reverse operation.

What I claim is:

1. Apparatus for moving a body resting on a surface or guide-way from one determinate point to another, comprising companion parallel bars disposed on each side of the body to be moved and having cooperating jaws engageable with the body, a follower connected to each bar, rectangularly slotted cams, and means for moving the followers along the slots whereby said bars are moved in unison in a cycle comprising four consecutive steps, namely, partial rotation in opposite directions, endwise movement in the same direction, reverse partial rotation and reverse endwise movement, each side of the rectangle corresponding to one step of said cycle.

2. Apparatus for moving a body resting on a surface or guide-way from one determinate point to another, comprising companion parallel bars disposed on each side of the body to be moved and having cooperating jaws engageable with the body, means for moving the bars in unison in a cycle comprising four consecutive steps, namely, partial rotation in opposite directions, endwise movement in the same direction, reverse partial rotation and reverse endwise movement, and steadying devices operatively connected to said bars and engageable with the body when disengaged from the jaws.

3. Apparatus for moving a body resting on a surface or guide-way from one determinate point to another, comprising companion parallel bars disposed on each side of the body to be moved and having cooperating body engaging members, means for moving the bars in unison in a cycle comprising four consecutive steps, namely, partial rotation in opposite directions, endwise movement in the same direction, reverse partial rotation and reverse endwise movement, and endwise immovable jaw-carrying rods parallel with said bars and connected to said bars to perform partial rotary movements concomitantly with said bars.

In testimony whereof I have signed my name to this specification.

THOMAS HERBERT WEBSTER.